(12) United States Patent
Muthuswamy Sivaraman et al.

(10) Patent No.: US 10,984,388 B2
(45) Date of Patent: Apr. 20, 2021

(54) IDENTIFYING COMPLAINTS FROM MESSAGES

(71) Applicant: International Business Machines Corporation, Armonk, NY (US)

(72) Inventors: Srinivasan Muthuswamy Sivaraman, Bangalore (IN); Subhendu Das, Chapel Hill, NC (US); Yashodhara M. Patnaik, Pune (IN)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 16/220,810

(22) Filed: Dec. 14, 2018

(65) Prior Publication Data

US 2020/0193380 A1  Jun. 18, 2020

(51) Int. Cl.
| | |
|---|---|
| *G06Q 10/10* | (2012.01) |
| *G06N 3/04* | (2006.01) |
| *G06N 3/08* | (2006.01) |
| *G06F 40/30* | (2020.01) |
| *G06F 40/216* | (2020.01) |

(52) U.S. Cl.
CPC ......... *G06Q 10/107* (2013.01); *G06F 40/216* (2020.01); *G06F 40/30* (2020.01); *G06N 3/0427* (2013.01); *G06N 3/082* (2013.01)

(58) Field of Classification Search
CPC ..... G06Q 10/107; G06F 40/216; G06F 40/30; G06N 3/0427; G06N 3/082
USPC ....................................................... 706/206
See application file for complete search history.

(56) References Cited

U.S. PATENT DOCUMENTS

| | | | | |
|---|---|---|---|---|
| 6,006,221 A | * | 12/1999 | Liddy | G06F 16/3337 |
| 7,716,229 B1 | * | 5/2010 | Srivastava | G06Q 30/02 |
| | | | | 707/749 |
| 7,904,512 B2 | * | 3/2011 | Goldberg | G06Q 10/10 |
| | | | | 709/204 |

(Continued)

OTHER PUBLICATIONS

Bastani, K., Namavari, H., & Shaffer, J. (2018). Latent Dirichlet Allocation (LDA) for Topic Modeling of the CFPB Consumer Complaints. CoRR, abs/1807.07468.

(Continued)

*Primary Examiner* — David P Zarka
(74) *Attorney, Agent, or Firm* — Troutman Pepper Hamilton Sanders LLP (57) ABSTRACT

Embodiments provide a computer implemented method in a data processing system comprising a processor and a memory comprising instructions, which are executed by the processor to cause the processor to implement the method of identifying negative communications from a plurality of electronic communications, including: extracting a plurality of terms from the plurality of electronic communications, wherein the plurality of terms include subjects, action verbs, adjectives and business objects; identifying variations of each term and grouping the variations for each term to form a dictionary; generating a co-occurrence graph to illustrate relationships between different terms in the plurality of terms; assigning each term with an entity type; identifying an intent for each business object using the co-occurrence graph; providing one or more rules, and identifying one or more negative communications based on the one or more rules.

17 Claims, 4 Drawing Sheets

(56) References Cited

U.S. PATENT DOCUMENTS

| | | | | |
|---|---|---|---|---|
| 7,996,210 | B2* | 8/2011 | Godbole | G06F 40/35 704/9 |
| 8,165,974 | B2* | 4/2012 | Privault | G06N 5/043 706/12 |
| 8,606,815 | B2* | 12/2013 | Chen | G06F 16/35 707/777 |
| 9,015,168 | B2* | 4/2015 | Cai | G06F 16/951 707/748 |
| 9,141,600 | B2* | 9/2015 | Tromp | G06F 40/253 |
| 9,355,155 | B1* | 5/2016 | Cassel | G06F 3/04842 |
| 9,413,855 | B2* | 8/2016 | Allen | H04L 67/10 |
| 9,817,893 | B2* | 11/2017 | Jaidka | G06F 16/345 |
| 10,372,741 | B2* | 8/2019 | Mathew | G06F 40/40 |
| 2005/0091038 | A1* | 4/2005 | Yi | G06F 40/216 704/10 |
| 2008/0275694 | A1* | 11/2008 | Varone | G06F 40/247 704/9 |
| 2012/0239668 | A1* | 9/2012 | Bhattacharyya | G06F 40/30 707/754 |
| 2013/0021346 | A1* | 1/2013 | Terman | G09B 5/08 345/467 |
| 2015/0106304 | A1* | 4/2015 | Gupta | G06N 5/04 706/11 |
| 2018/0322508 | A1* | 11/2018 | Walthers | G06F 40/279 |

OTHER PUBLICATIONS

Deshpande, S., Palshikar, G.K., & Athiappan, G. (2010). An Unsupervised Approach to Sentence Classification. COMAD.

Forster, J. & Entrup. B. (2017). A Cognitive Computing Approach for Classification of Complaints in the Insurance Industry. IOP Conf. Ser.: Mater. Sci. Eng. 261 012016.

Jarrar, M., Verlinden, R., & Merrsman, R. (2003). Ontology-based Customer Complaint Management. Proceedings of the Workshop on Regulatory Ontologies and the Modeling of Complaint Regulations. WORM CoRe 2003.

Nice. (2013). Communication Surveillance: A Proactive Approach to Trading Compliance. Retrieved from the Internet: URL: https://www.niceactimize.com/Lists/Brochures/FMC_Brochure_CommunicationSurveillance.pdf [retrieved on Dec. 14, 2018].

* cited by examiner

Extraction Result

Subjects (Context)
- i
- you
- we
- me
- they
- us
- them
- he
- she
- her
- him

Action verbs (Intent)
- will not pay
- did not hear
- never replied
- not what we agreed
- not aware of
- did not expect
- not fair
- never said anything
- expecting a refund
- not able to upload or

Adjectives (Emotion)
- angry
- annoyed
- complicated
- concerned
- confused
- confusing
- cumbersome
- difficult
- disappointed
- disappointing
- dissatisfied

Business Objects
- rate_lock
- lock_fee
- appraisal_fee
- Appraisal
- Appraiser
- counter_offer
- credit_approval
- Underwriter
- pre_approval
- loan_approval

IDENTIFYING COMPLAINTS FROM MESSAGES

TECHNICAL FIELD

The present disclosure relates generally to a system, method, and computer program product that are used to detect and categorize one or more negative communications from a large number of electronic communications, such as emails.

BACKGROUND

When detecting misconducts of employees, there is a need to check employee communications, e.g. emails, to identify any negative communications (e.g., complaints) reported by customers, and categorize the identified negative communications based on negative communication themes and products related to the identified negative communications. Currently, some machine learning techniques (e.g., word2vec, doc2vec, clustering, topic modelling, etc.) are applied to detect negative communications. However, these machine learning techniques require intense labelling and training, because short communications, such as emails, are different from regular documents. Specifically, some emails are very short with very limited word counts. Further, short communications, e.g., emails generally have no specific topics or titles. Moreover, emails from customers generally include background stories, which may be noises for the machine learning models. If these emails are directly input to the machine learning models in the prior art, the results of identification and categorization of the negative communications may be poor due to the noises. Thus, there is a need/desire to identify and categorize negative communications from a large number of electronic communications with little manual work.

SUMMARY

Embodiments provide a computer implemented method in a data processing system comprising a processor and a memory comprising instructions, which are executed by the processor to cause the processor to implement the method of identifying negative communications from a plurality of electronic communications, the method comprising: extracting, by the processor, a plurality of terms from the plurality of electronic communications, wherein the plurality of terms include subjects, action verbs, adjectives and business objects; identifying, by the processor, variations of each term and grouping the variations of each term to form a dictionary; generating, by the processor, a co-occurrence graph to illustrate relationships between different terms in the plurality of terms; assigning, by the processor or a user, each term with an entity type; identifying, by the processor, an intent for each business object using the co-occurrence graph; and providing, by the processor or the user, one or more rules, and identifying one or more negative communications based on the one or more rules.

Embodiments further provide a computer implemented method, further comprising: capturing, by the user, ground truth data from the plurality of electronic communications; and training, by the processor, one or more supervised machine learning models using the ground truth data.

Embodiments further provide a computer implemented method, further comprising: providing, by the processor, one or more preset dictionaries and rules; and pre-annotating, by the processor, the plurality of electronic communications with the one or more preset dictionaries and rules.

Embodiments further provide a computer implemented method, further comprising: sampling, by the processor, a group of electronic communications from the plurality of electronic communications by random sampling or stratified sampling.

Embodiments further provide a computer implemented method, wherein the one or more supervised machine learning models include at least one of a deep neural network, logistic regression, and random forest.

Embodiments further provide a computer implemented method, further comprising: providing a new email to the one or more trained supervised machine learning models; and identifying a negative communication from the new email.

Embodiments further provide a computer implemented method, wherein each subject indicates the context of each email, each action verb indicates an intent of each email, and each adjective indicates an emotion of each email.

Embodiments further provide a computer implemented method, further comprising: presenting, by the processor, the identified variations of each term for each entity type, to the user; and if the user confirms the identified variations of each term is matched with a particular entity type, assigning, by the processor, the identified variations of each term with the particular entity type.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawing embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Embodiments of the present invention may be a system, a method, and/or a computer program product. The computer program product may include a computer readable storage medium (or media) having computer readable program instructions thereon for causing a processor to carry out aspects of the present invention.

In an embodiment, a system, method, and computer program product for detecting and categorizing negative communications from a large number of electronic documents (e.g., emails) are provided. The system, method, and computer program product can extract subjects, action verbs, business objects, and adjectives indicative of emotions from each electronic document at a sentence level through unsupervised learning, capture ground truth, and then leverage the ground truth for supervised machine learning to identify and categorize negative communications. In an embodiment, the electronic documents include emails, online feedbacks, etc. from customers. In another embodiment, the electronic documents can also include text files transformed from speeches via Speech-to-Text technology.

Figure 1:
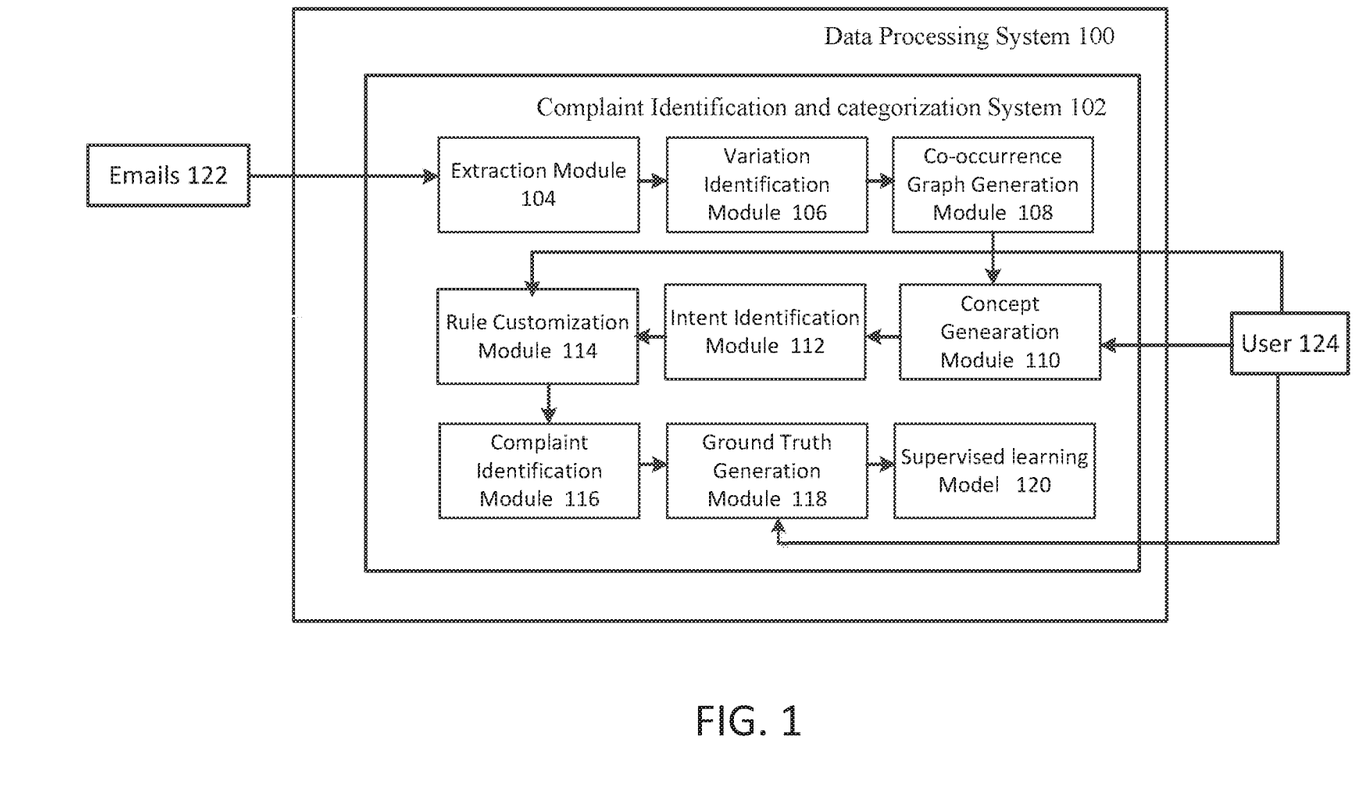
FIG. 1 depicts a block diagram of a negative communication identification and categorization system 102 implemented on an example data processing system 100, according to embodiments herein.

FIG. 1 depicts a block diagram of a negative communication identification and categorization system, according to embodiments herein. As shown in FIG. 1, data processing system 100 is an example of a computer, such as a server or client, in which computer usable code or instructions implementing the process for illustrative embodiments of the present invention are located. In one embodiment, the data processing system 100 represents a computing device. The negative communication identification and categorization system 102 is implemented on the data processing system 100, and the negative communication identification and categorization system 102 is a type of cognitive system.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like accuracy at speeds far faster than human beings and on a much larger scale. In general, such cognitive systems are able to perform the following functions:

- Navigate the complexities of human language and understanding
- Ingest and process vast amounts of structured and unstructured data
- Generate and evaluate hypotheses
- Weigh and evaluate responses that are based only on relevant evidence
- Provide situation-specific advice, insights, and guidance
- Improve knowledge and learn with each iteration and interaction through machine learning processes
- Enable decision making at the point of impact (contextual guidance)
- Scale in proportion to the task
- Extend and magnify human expertise and cognition
- Identify resonating, human-like attributes and traits from natural language
- Deduce various language specific or agnostic attributes from natural language
- High degree of relevant recollection from data points (images, text, voice) (memorization and recall)
- Predict and sense with situation awareness that mimic human cognition based on experiences
- Answer questions based on natural language and specific evidence As shown in FIG. 1, the negative communication identification and categorization system 102 includes the extraction module 104, the variation identification module 106, the co-occurrence graph generation module 108, the concept generation module 110, the intent identification module 112, the rule customization module 114, the negative communication identification module 116, the ground truth generation module 118, and the supervised learning model 120. The electronic communications (e.g., emails) 122 are provided to the negative communication identification and categorization system 102 for processing. The extraction module 104 can automatically extract subjects, action verbs, adjectives, and business objects from the emails 122 at a sentence level. The variation identification module 106 can automatically identify variations of the extracted subjects, action verbs, adjectives, and business objects. The variations of each term are grouped together to form a dictionary. The co-occurrence graph generation module 108 can generate a co-occurrence graph to illustrate relationships between different terms or different dictionaries. The concept generation module 110 can generate a concept or entity type for each of the subjects, action verbs, adjectives, and business objects. Further, for each generated concept, variations of each term identified by the variation identification module 106 can be suggested and presented to the user 124. Upon confirmation of the user 124, variations of a particular term can also be assigned with this concept. The intent identification module 112 can identify an intent associated with a particular business object using the co-occurrence graph generated by the co-occurrence graph generation module 108. The user 124 can make rules for identifying a negative communication through the rule customization module 114. In an embodiment, the user 124 makes customized rules from scratch. In another embodiment, the preset rules are provided, and the user 124 can adjust the preset rules for a particular negative communication identification project. The negative communication identification module 116 can identify negative communications based on the rules made through the rule customization module 114. The ground truth generation module 118 can capture ground truth data of the sampled emails upon confirmation of the user 124. The supervised learning model 120 can be trained by the ground truth data captured through the ground truth generation module 118.

In an embodiment, the negative communication identification and categorization system 102 can further include a pre-annotator, configured to pre-annotate emails with the initial preset dictionaries and rules. In a specific example, an example email from a customer is provided: "I decided to sell my house, however I have a XXXX tax lien hold, and I have been trying hard to get rid of the lien hold on my house. I have finally fixed this issue and have a buyer who is willing to buy my house immediately. However, the lender Bank A is NOT being cooperative and taking too long for the process, and the Bank A has also put me in FORECLOSURE status and is NOT willing to extend my Due date of XXXX XXXX 2017 . . . " This email can be pre-annotated with a plurality of concepts. Specifically, the subject "Bank A" (assigned with the concept "Bank"), the business objects "the process" (assigned with the concept "Process: general")

and "due date" (assigned with the concept "deadline") are extracted. The intents "NOT being cooperative" (assigned with the concept "Responsiveness"), "taking too long" (assigned with the concept "Delay") and the "NOT willing to extend" (assigned with the concept "Responsiveness") are identified.

Figure 2:
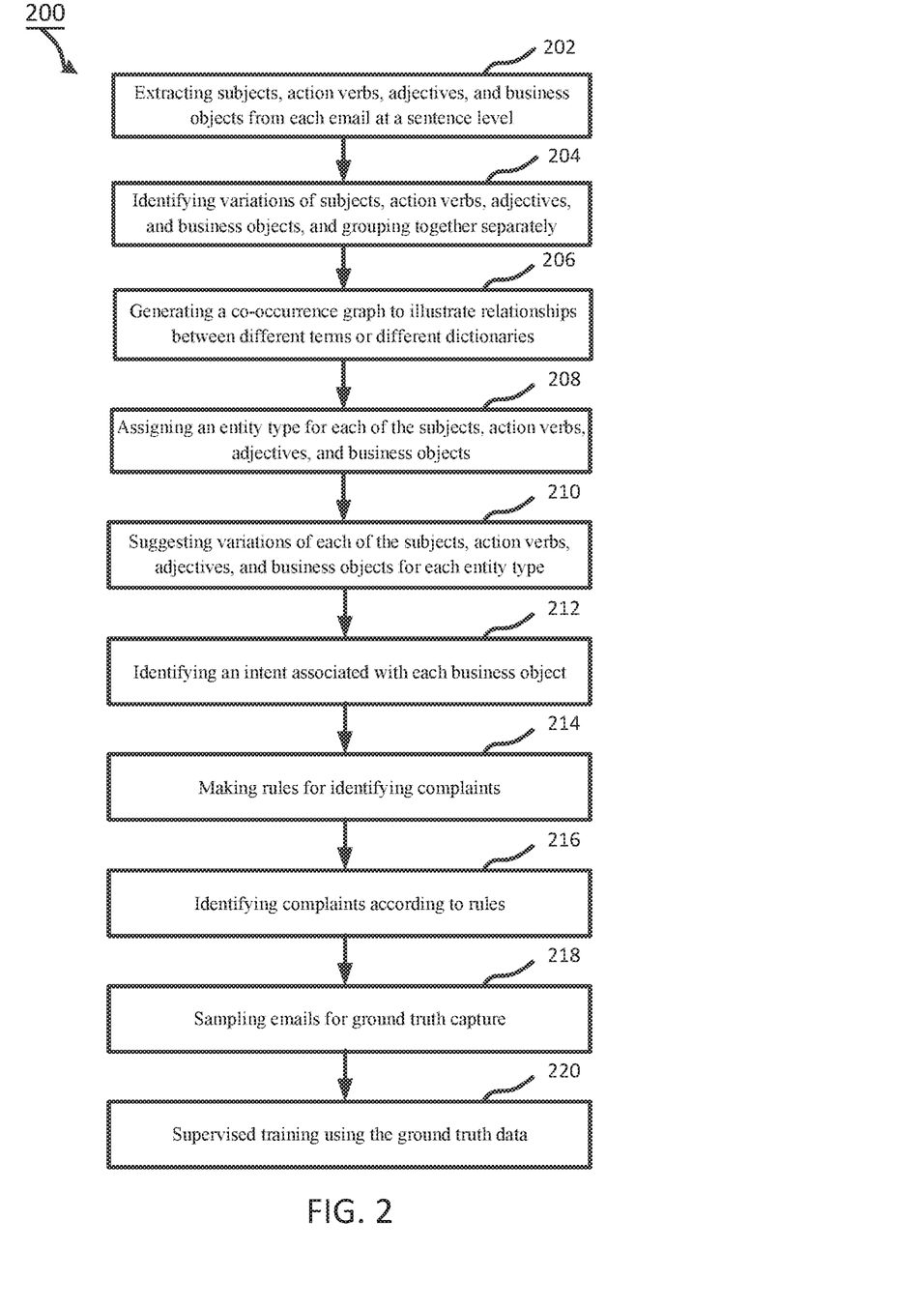
FIG. 2 depicts a flowchart illustrating a method 200 of detecting and categorizing negative communications from a large number of emails, according to embodiments herein.
Figure 3:
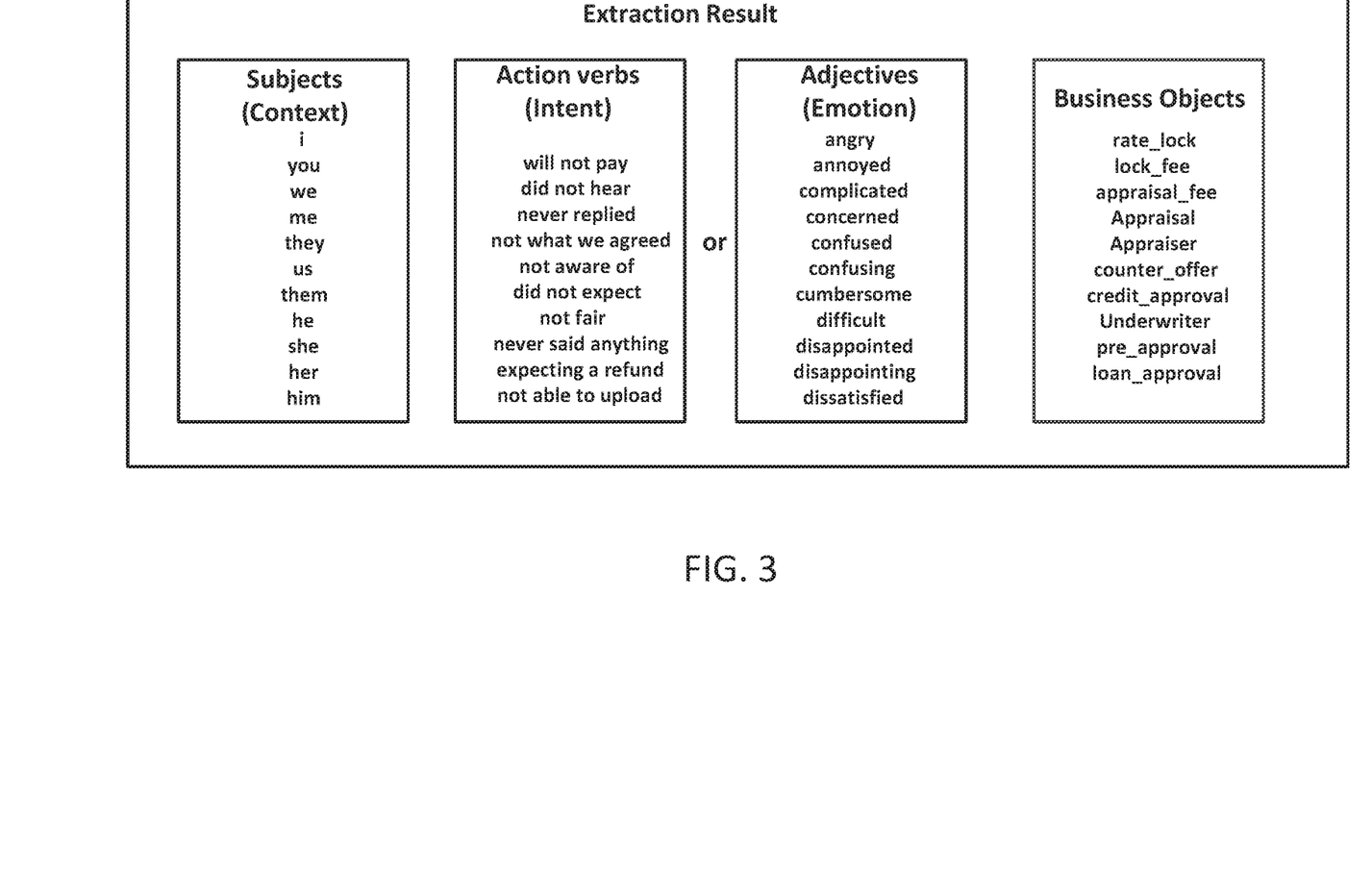
FIG. 3 depicts an example extraction result 300 of a plurality of emails, according to embodiments herein.

FIG. 2 depicts a flowchart illustrating a method 200 of detecting and categorizing negative communications from a large number of emails, according to embodiments herein. As shown in FIG. 2, at step 202, subjects indicative of the context of each email, action verbs indicative of an intent of each email, adjectives indicative of an emotion of each email, and business objects are extracted from each email at a sentence level. In an embodiment, the emails can be communication emails between bank employees and customers. For example, the subject "Bank A" indicates the context of a bank; the subject "I" indicates the context of a customer; the action verb "will not pay" indicates an intent of the customer, i.e., the reason or purpose of sending this email by this customer; the adjective "angry" indicates an emotion, which can be used to identify dissatisfaction and/or sentiment of a customer; the business object "rate-lock" indicates this email is related to mortgage. FIG. 3 depicts an example extraction result 300 of a plurality of emails. These subjects 302, action verbs 304, adjectives 306, and business objects 308 are extracted from emails by information extraction (IE). The information extraction is a process of extracting essential elements from structured text or knowledge from unstructured text by identifying references to named entities as well as stated relationships between such entities.

At step 204, variations of subjects, action verbs, adjectives, and business objects are identified and grouped together separately. For example, "rate-lock," "rate-lock extension," "rate-lock fee," "rate-lock period" etc. are grouped together to form a "rate-lock process" dictionary. For another example, "I," "we," "my," "our" can be grouped together to form a "customer" dictionary.

At step 206, a co-occurrence graph is generated to illustrate relationships between different terms or different dictionaries. The co-occurrence graph can be used to identify which term co-occurs with which term, and identify co-relation between different terms and different dictionaries. For example, the business object "application processing" most likely occurs with "documents," "validation," "submission." The co-occurrence graph can make annotation process more efficiently. Specifically, when a user, e.g. a bank analyst, annotates a term "appraisal," the user notes that the term "rate-lock" is close to "appraisal" in the co-occurrence graph, which indicates that "rate-lock" most likely co-occurs with "appraisal." Thus, the user can quickly locate the term "rate-lock" in the email for an annotation.

At step 208, the extracted subjects, action verbs, adjectives, and business objects are presented to the user (e.g. a bank analyst), and the user assigns an entity type (also called concept) for each of the subjects, action verbs, adjectives, and business objects. In an embodiment, the entity types (concepts) can be product names of a bank, process names of a bank, subjects, or intents. For example, the entity type or concept "rate-lock process" is assigned to the term "rate-lock." The entity type or concept "delays" is assigned to the term "taking too long." Entity types or concepts, such as "dissatisfaction," "delays," "rate lock," "appraisal" etc., are assigned to terms extracted from the emails. These entity types or concepts can be subsequently used to determine which email is a negative communication, and if certain emails are negative communications related to mortgage, which sub-process (appraisal, rate-lock, closing, underwriting, application processing, etc.) of the mortgage (an example business unit of a bank) the customers are complaining about and what are the reasons (i.e., intents, such as delays, sales practice, responsiveness, etc.) of the negative communications.

At step 210, variations of each of the subjects, action verbs, adjectives, and business objects are suggested to the user for this entity type. Specifically, when the user assigns a subject, an action verb, an adjective or a business object with an entity type, variations of this subject, action verb, adjective or business object obtained in the step 204 are suggested to the user for this entity type annotation. For example, if the user assigns the term "rate-lock" with the entity type "rate_lock_process," variations of "rate-lock," such as "rate_lock_extension," "rate_lock_expiry," etc. which were identified in the step 204, are presented to the user, suggesting that "rate_lock_extension," "rate_lock_expiry," etc. also be assigned with the entity type "rate_lock_process." The user confirms whether "rate_lock_extension," "rate_lock_expiry," etc. should be assigned with the same entity type "rate_lock_process."

At step 212, for each business object, the most frequently co-occurred action verb (the most general action verb) is identified to further identify an intent (positive intent or negative intent) associated with this business object. The co-occurrence graph generated in the step 206 can be used to identify the intent. For example, the most frequently co-occurred action verb for the business object "rate_lock" is "pay," and the intent related to the business object "rate_lock" is a negative intent due to the phrase "will not." Thus, for the business object "rate_lock," the action verb "pay" is performed with a negative intent.

At step 214, customized rules can be made to identify a negative communication. In an example, an example semantic rule is provided below to identify a negative communication: (subject: customer; verb: pay cancel in the context of negative emotion/dissatisfaction; business object: any). This semantic rule indicates that if a customer does not pay or later cancels a payment with a negative emotion or dissatisfaction, then it is determined that the customer has a negative communication. If the content in an email satisfies the rule, then there is at least a negative communication identified in the email. Various rules can be made to detect different negative communications for different bank products, processes and/or negative communication reasons (intents).

At step 216, based on the rules made in the step 214, negative communications in all the ingested emails are detected and categorized. Various intents are annotated in the emails for different negative communications, and the detected negative communications can be categorized based on the related bank product, product processes, and/or intents.

At step 218, the annotated emails can be sampled and presented to the user to capture ground truth data. Specifically, for each identified negative communication, if the user agrees with any identified negative communication and categorization of this negative communication, then this negative communication result is determined as ground truth data. In an embodiment, the customized rules can be adjusted by the user. The annotated emails can be sampled through sampling techniques, such as random sampling, stratified sampling, etc. to choose certain emails from a huge number of emails.

At step 220, the ground truth data can be used for supervised training. In an embodiment, classification models based on deep neural network can be used. In another embodiment, the deep neural network can be combined with machine learning models, such as logistic regression, etc., and ensemble learning models, such as random forest, etc., to get better predictability.

After the supervised training is done, a new set of emails can be input into the newly trained model, and concepts (entity types) in the emails can be annotated to identify one or more negative communications, and further identify which product, process, and intent each negative communication is related to.

In an embodiment, preset dictionaries (entities assigned with a same entity type) and preset rules of detecting negative communications can be provided to pre-annotate emails when the user just starts to annotate a large number of emails. The large number of emails can be pre-annotated using an unsupervised Watson™ Discovery system. The user can adjust the preset dictionaries and rules to adapt to the user's specific requirements for the large number of emails. The preset dictionaries and rules reduce a work load of the user, and the user can adjust the preset dictionaries and rules to adapt to a new negative communication identification project, without creating dictionaries and rules from scratch.

Further, in an embodiment, the system, method, and computer program product of the disclosure can extract subjects, action verbs, adjectives, and business objects, and identify variations thereof through unsupervised training. Thus, variations of subjects, action verbs, adjectives, and business objects are captured in the training dataset for later supervised training. By contrast, if emails are randomly chosen to prepare the training dataset, then the variations cannot be captured in the training dataset, leading to a poor training result.

With the system, method, and computer program product of the disclosure, variations of the subjects, action verbs, adjectives, and business objects can be automatically identified through unsupervised training, which requires little manual work, thereby improving the productivity in terms of identifying the lexicons and/or rules.

Figure 4:
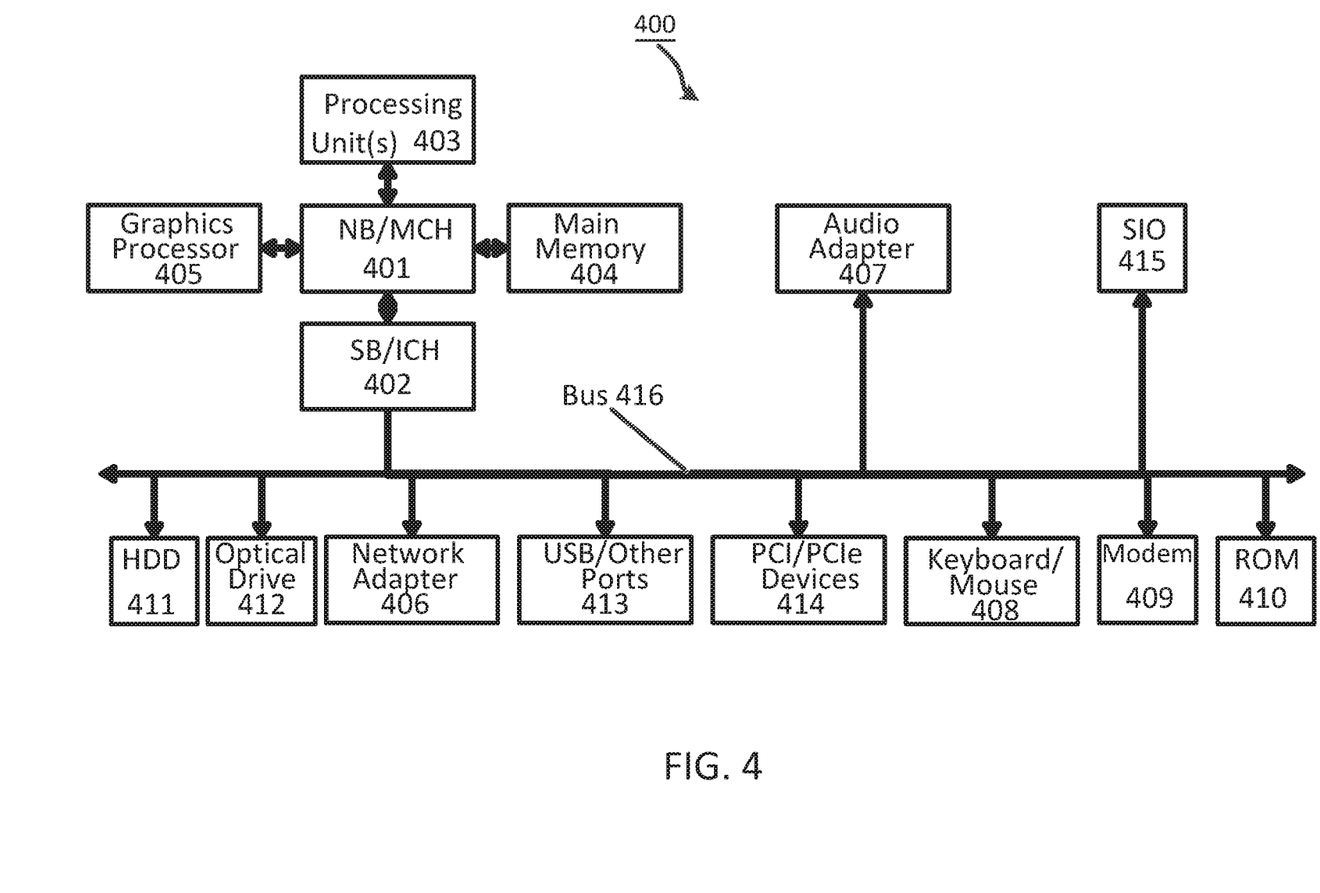
FIG. 4 is a block diagram of another example data processing system 400 in which aspects of the illustrative embodiments may be implemented.

FIG. 4 is a block diagram of an example data processing system 400 in which aspects of the illustrative embodiments may be implemented. The data processing system 400 is an example of a computer, such as a server or client, in which computer usable code or instructions implementing the process for illustrative embodiments of the present invention are located. In one embodiment, FIG. 4 may represent a server computing device.

In the depicted example, data processing system 400 may employ a hub architecture including a north bridge and memory controller hub (NB/MCH) 401 and south bridge and input/output (I/O) controller hub (SB/ICH) 402. Processing unit 403, main memory 404, and graphics processor 405 may be connected to the NB/MCH 401. Graphics processor 405 may be connected to the NB/MCH 401 through an accelerated graphics port (AGP) (not shown in FIG. 4).

In the depicted example, the network adapter 406 connects to the SB/ICH 402. The audio adapter 407, keyboard and mouse adapter 408, modem 409, read only memory (ROM) 410, hard disk drive (HDD) 411, optical drive (CD or DVD) 412, universal serial bus (USB) ports and other communication ports 413, and the PCI/PCIe devices 414 may connect to the SB/ICH 402 through bus system 416. PCI/PCIe devices 414 may include Ethernet adapters, add-in cards, and PC cards for notebook computers. ROM 410 may be, for example, a flash basic input/output system (BIOS). The HDD 411 and optical drive 412 may use an integrated drive electronics (IDE) or serial advanced technology attachment (SATA) interface. The super I/O (SIO) device 415 may be connected to the SB/ICH 402.

An operating system may run on processing unit 403. The operating system could coordinate and provide control of various components within the data processing system 400. As a client, the operating system may be a commercially available operating system. An object-oriented programming system, such as the Java™ programming system, may run in conjunction with the operating system and provide calls to the operating system from the object-oriented programs or applications executing on data processing system 400. As a server, the data processing system 400 may be an IBM® eServer™ System p® running the Advanced Interactive Executive operating system or the Linux operating system. The data processing system 400 may be a symmetric multiprocessor (SMP) system that may include a plurality of processors in the processing unit 403. Alternatively, a single processor system may be employed.

Instructions for the operating system, the object-oriented programming system, and applications or programs are located on storage devices, such as the HDD 411, and are loaded into the main memory 404 for execution by the processing unit 403. The processes for embodiments of the generation system may be performed by the processing unit 403 using computer usable program code, which may be located in a memory such as, for example, main memory 404, ROM 410, or in one or more peripheral devices.

A bus system 416 may be comprised of one or more busses. The bus system 416 may be implemented using any type of communication fabric or architecture that may provide for a transfer of data between different components or devices attached to the fabric or architecture. A communication unit such as the modem 409 or network adapter 406 may include one or more devices that may be used to transmit and receive data.

Those of ordinary skill in the art will appreciate that the hardware depicted in FIG. 4 may vary depending on the implementation. Other internal hardware or peripheral devices, such as flash memory, equivalent non-volatile memory, or optical disk drives may be used in addition to or in place of the hardware depicted. Moreover, the data processing system 400 may take the form of a number of different data processing systems, including but not limited to, client computing devices, server computing devices, tablet computers, laptop computers, telephone or other communication devices, personal digital assistants, and the like. Essentially, the data processing system 400 may be any known or later developed data processing system without architectural limitation.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one may also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes may be implemented using hardware components, software components, and/or combinations thereof. No claim element herein is to be construed under the provisions of 35 U.S.C. 112 (f) unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer implemented method in a data processing system comprising a processor and a memory comprising instructions, which are executed by the processor to cause the processor to implement the method of identifying a complaint from a plurality of electronic communications, the method comprising:
    extracting, by the processor, a plurality of terms from the plurality of electronic communications through unsupervised learning, wherein the plurality of terms include subjects, action verbs, adjectives and business objects;
    identifying, by the processor, variations of each term among the plurality of terms and grouping the variations of each term among the plurality of terms to form a dictionary, wherein each variation has a correct spelling;
    generating, by the processor, a co-occurrence graph to illustrate relationships between different terms in the plurality of terms;
    assigning, by the processor or a user, each term among the plurality of terms with an entity type;
    identifying, by the processor, a negative intent for each business object among the business objects using the most frequently co-occurred action verb in the co-occurrence graph and a negative phrase modifying the most frequently co-occurred action verb;
    providing, by the processor or the user, one or more rules, and identifying one or more complaints based on the one or more rules;
    sampling, by the processor, a group of electronic communications from the plurality of electronic communications by stratified sampling;
    capturing, by the user, ground truth data from the group of electronic communications; and
    training, by the processor, one or more supervised machine learning models using the ground truth data.

2. The method as recited in claim 1, further comprising:
    providing, by the processor, one or more preset dictionaries and rules; and
    pre-annotating, by the processor, the plurality of electronic communications with the one or more preset dictionaries and rules.

3. The method as recited in claim 2, further comprising:
    providing a new email to the one or more trained supervised machine learning models; and
    identifying a new complaint from the new email.

4. The method as recited in claim 3, wherein each subject indicates a context of each email, each action verb indicates an intent of each email, and each adjective indicates an emotion of each email.

5. The method as recited in claim 1, wherein the one or more supervised machine learning models include at least one of a deep neural network, logistic regression, and random forest.

6. The method as recited in claim 1, further comprising:
    presenting, by the processor, the identified variations of each term among the plurality of terms for each entity type to the user; and
    if the user confirms that the identified variations of each term among the plurality of terms is matched with a particular entity type,
        assigning, by the processor, the identified variations of each term among the plurality of terms with the particular entity type.

7. A computer program product for identifying a complaint from a plurality of electronic communications, the computer program product comprising a computer readable storage medium having program instructions embodied therewith, the program instructions executable by a processor to cause the processor to:
    extract a plurality of terms from the plurality of electronic communications through unsupervised learning, wherein the plurality of terms include subjects, action verbs, adjectives and business objects;
    identify variations of each term among the plurality of terms and grouping the variations of each term among the plurality of terms to form a dictionary, wherein each variation has a correct spelling;
    generate a co-occurrence graph to illustrate relationships between different terms in the plurality of terms;
    assign each term among the plurality of terms with an entity type;
    identify a negative intent for each business object among the business objects using the most frequently co-occurred action verb in the co-occurrence graph and a negative phrase modifying the most frequently co-occurred action verb;
    provide one or more rules, and identify one or more complaints based on the one or more rules;
    sample a group of electronic communications from the plurality of electronic communications by stratified sampling;
    capture ground truth data from the group of electronic communications; and
    train one or more supervised machine learning models using the ground truth data.

8. The computer program product as recited in claim 7, wherein the processor is further caused to:
    provide one or more preset dictionaries and rules; and
    pre-annotate the plurality of electronic communications with the one or more preset dictionaries and rules.

9. The computer program product as recited in claim 8, wherein the processor is further caused to:
    categorize the one or more complaints based on the intent of each complaint among the one or more complaints, a bank product, or a bank process related to each complaint among the one or more complaints.

10. The computer program product as recited in claim 8, wherein the one or more supervised machine learning models include at least one of a deep neural network, logistic regression, and random forest.

11. The computer program product as recited in claim 8, wherein each subject indicates a context of each email, each action verb indicates an intent of each email, and each adjective indicates an emotion of each email.

12. The computer program product as recited in claim 7, wherein the processor is further caused to:
provide a new email to the one or more trained supervised machine learning models; and
identify a new complaint from the new email.

13. A system for identifying a complaint from a plurality of emails, comprising:
a processor and a memory comprising instructions,
wherein the instructions are executed by the processor to cause the processor to:
extract a plurality of terms from the plurality of emails through unsupervised learning, wherein the plurality of terms include subjects, action verbs, adjectives and business objects;
identify variations of each term among the plurality of terms and grouping the variations of each term among the plurality of terms to form a dictionary, wherein each variation has a correct spelling;
generate a co-occurrence graph to illustrate relationships between different terms in the plurality of terms;
assign each term among the plurality of terms with an entity type;
identify a negative intent for each business object among the business objects using the most frequently co-occurred action verb in the co-occurrence graph and a negative phrase modifying the most frequently co-occurred action verb;
provide one or more rules, and identify one or more complaints based on the one or more rules;
sample a group of emails from the plurality of emails by stratified sampling;
capture ground truth data from the group of emails; and
train one or more supervised machine learning models using the ground truth data.

14. The system as recited in claim 13, wherein the processor is further configured to:
provide one or more preset dictionaries and rules; and
pre-annotate the plurality of electronic communications with the one or more preset dictionaries and rules.

15. The system as recited in claim 13, the processor is further configured to:
categorize the one or more complaints based on the intent of each complaint among the one or more complaints, a bank product, or a bank process related to each complaint among the one or more complaints.

16. The system as recited in claim 15, wherein the processor is further configured to:
provide a new email to the one or more trained supervised machine learning models; and
identify a new complaint from the new email.

17. The system as recited in claim 16, wherein each subject indicates a context of each email, each action verb indicates an intent of each email, and each adjective indicates an emotion of each email.

* * * * *